US012748734B2

(12) United States Patent
Singh et al.

(10) Patent No.: US 12,748,734 B2
(45) Date of Patent: Sep. 29, 2026

(54) CANONICAL TRANSFORMATIONS USING MACHINE LEARNING LANGUAGE MODEL

(71) Applicant: UnitedHealth Group Incorporated, Minnetonka, MN (US)

(72) Inventors: Sanjay Kumar Singh, Bengaluru (IN); Subhasis Jethy, Bangalore (IN); Udit Saini, Uttarakhand (IN); Carlos W. Morato, Sammamish, WA (US); Rahul Bhotika, Bellevue, WA (US); Ranju Das, Seattle, WA (US); Vasant Manohar, Apex, NC (US)

(73) Assignee: UNITEDHEALTH GROUP INCORPORATED, Minnetonka, MN (US)

( * ) Notice: Subject to any disclaimer, the term of this patent is extended or adjusted under 35 U.S.C. 154(b) by 645 days.

(21) Appl. No.: 18/331,530

(22) Filed: Jun. 8, 2023

(65) Prior Publication Data

US 2024/0411732 A1 Dec. 12, 2024

(51) Int. Cl.

| | |
|---|---|
| ***G06F 16/21*** | (2019.01) |
| ***G06F 16/25*** | (2019.01) |
| ***G06N 3/044*** | (2023.01) |

(52) U.S. Cl.

CPC .......... *G06F 16/211* (2019.01); *G06F 16/258* (2019.01); *G06N 3/044* (2023.01)

(58) Field of Classification Search

CPC ...... G06F 16/211; G06F 16/258; G06N 3/044

See application file for complete search history.

(56) References Cited

U.S. PATENT DOCUMENTS

| | | |
|---|---|---|
| 7,822,768 B2 | 10/2010 | Maymir-Ducharme et al. |
| 9,626,451 B2 | 4/2017 | Dietrich et al. |

(Continued)

FOREIGN PATENT DOCUMENTS

| | | |
|---|---|---|
| CN | 113505590 A | 10/2021 |
| WO | 2019/203863 A1 | 10/2019 |

(Continued)

OTHER PUBLICATIONS

Mena et al., (Learning Latent Permutations With Gumbelsinkhorn Networks, Iclr 2018, 22 pages) (Year: 2018).*

(Continued)

*Primary Examiner* — Oleg Korsak

(74) *Attorney, Agent, or Firm* — ALSTON & BIRD LLP

(57) ABSTRACT

Various embodiments of the present disclosure provide machine learning techniques for transforming disparate, third-party datasets to canonical representations. The techniques include generating, using a machine learning prediction model, a canonical representation for an input dataset. The machine learning prediction model is previously trained using permutative input embeddings for a training dataset based on canonical data entity features, such that each permutative input embedding corresponds to a different sequence of the canonical data entity features. The permutative input embeddings are leveraged to generate a latent representation for the training dataset. The latent representation is combined with a canonical data map to generate an alignment vector, which is refined to generate an output vector for the input dataset. The machine learning prediction model is trained using a model loss generated based on a comparison of the output vector with a corresponding labeled vector.

20 Claims, 8 Drawing Sheets

(56) References Cited

U.S. PATENT DOCUMENTS

| | | | | |
|---|---|---|---|---|
| 10,191,969 | B2 | 1/2019 | Yan | |
| 10,726,025 | B2 | 7/2020 | Guo et al. | |
| 11,170,166 | B2 * | 11/2021 | Bellegarda | G06N 7/01 |
| 11,354,582 | B1 * | 6/2022 | Prat | G06N 7/01 |
| 11,366,966 | B1 | 6/2022 | Ramsey et al. | |
| 12,242,945 | B1 * | 3/2025 | Everest | G06N 20/00 |
| 2017/0011107 | A1 | 1/2017 | Shet et al. | |
| 2018/0137404 | A1 | 5/2018 | Fauceglia et al. | |
| 2018/0150808 | A1 * | 5/2018 | Haley | G06Q 20/10 |
| 2018/0189265 | A1 | 7/2018 | Chen et al. | |
| 2018/0253669 | A1 | 9/2018 | Thunoli et al. | |
| 2019/0279101 | A1 | 9/2019 | Habti et al. | |
| 2020/0110809 | A1 * | 4/2020 | DeFelice | G06N 3/094 |
| 2020/0201834 | A1 | 6/2020 | Ye et al. | |
| 2020/0349129 | A1 | 11/2020 | Bracholdt et al. | |
| 2020/0380212 | A1 | 12/2020 | Butler et al. | |
| 2021/0183484 | A1 * | 6/2021 | Shaib | G06N 20/00 |
| 2021/0295822 | A1 | 9/2021 | Tomkins et al. | |
| 2022/0198286 | A1 * | 6/2022 | Prat | G06N 3/0455 |
| 2022/0207343 | A1 | 6/2022 | Lei et al. | |
| 2022/0269663 | A1 | 8/2022 | Raphael et al. | |
| 2022/0350810 | A1 | 11/2022 | Majumdar et al. | |
| 2022/0358373 | A1 * | 11/2022 | Bucher | G06N 3/045 |
| 2022/0374735 | A1 | 11/2022 | Rathod et al. | |
| 2023/0038256 | A1 * | 2/2023 | Tal | G16B 40/00 |
| 2023/0290114 | A1 * | 9/2023 | Prat | G06N 3/0455 |
| 2023/0325366 | A1 | 10/2023 | Erett et al. | |

FOREIGN PATENT DOCUMENTS

| | | | |
|---|---|---|---|
| WO | 2019/227073 | A1 | 11/2019 |
| WO | 2019/229769 | A1 | 12/2019 |

OTHER PUBLICATIONS

Imani et al., (Representation Alignment in Neural Networks, arXiv, Sep. 17, 2022, 26 pages) (Year: 2022).*

Chen, Harr et al. "Content Modeling Using Latent Permutations," Journal of Artificial Intelligence Research, vol. 36, Oct. 2009, pp. 129-163, DOI: 10.1613/jair.2830.

Chrupala, Grzegorz. "Normalizing Tweets With Edit Scripts and Recurrent Neural Embeddings," In Proceedings of the 52nd Annual Meeting of the Association for Computational Linguistics, vol. 2: Short Papers, Jun. 2014, pp. 680-686.

Duarte, José Marcio et al. "Deep Analysis of Word Sense Disambiguation via Semi-Supervised Learning and Neural Word Representations," Information Sciences, vol. 570, Sep. 2021, pp. 278-297, DOI: 10.1016/j.ins.2021.04.006.

Huang, Hongzhao et al. "Leveraging Deep Neural Networks and Knowledge Graphs for Entity Disambiguation," arXiv preprint arXiv:1504.07678v1 [cs.CL], Apr. 28, 2015, (10 pages), available online: https://arxiv.org/pdf/1504.07678.pdf.

Lourentzou, Ismini et al. "Adapting Sequence to Sequence Models for Text Normalization in Social Media," In Proceedings of the international AAAI Conference on Web and Social Media, vol. 13, Jul. 6, 2019, pp. 335-345.

Raiman, Jonathan et al. "DeepType: Multilingual Entity Linking by Neural Type System Evolution," Proceedings of the AAAI Conference on Artificial Intelligence, vol. 32, No. 1, Apr. 27, 2018, pp. 5406-5413, DOI: 10.1609/aaai.v32i1.12008.

Shen, Wei et al. "Entity Linking Meets Deep Learning: Techniques and Solutions," arXiv preprint arXiv:2109.12520v1 [cs.CL], Sep. 26, 2201, pp. 1-20, available online: https://arxiv.org/pdf/2109.12520.pdf.

Sinha, Koustuv et al. "UnNatural Language Inference," arXiv preprint arXiv:2101.00010v2 [cs.CL], Jun. 11, 2021, (18 pages), available online: https://arxiv.org/pdf/2101.00010.pdf.

Vretinaris, Alina et al. "Medical Entity Disambiguation Using Graph Neural Networks," arXiv preprint arXiv:2104.01488v1 [cs.IR], Apr. 3, 2021, (10 pages), available online: https://arxiv.org/pdf/2104.01488.pdf.

Xie, Jie et al. "Joint Entity Linking for Web Tables With Hybrid Semantic Matching," In Computational Science—ICCS 2020: 20th International Conference, Proceedings, Part II 20 2020, Amsterdam, The Netherlands, Jun. 15, 2020, pp. 618-631, DOI: 10.1007/978-3-030-50417-5_46.

Fan, Grace et al., "Semantics-aware Dataset Discovery from Data Lakes with Contextualized Column-based Representation Learning", submitted Oct. 4, 2022, to Cornell University Olin Online Library Archive, available on the Internet at https://arxiv.org/pdf/2210.01922v1, 7 pages.

Luo, Yuan, et al., "Implementing a Portable Clinical NLP System with a Common Data Model—a Lisp Perspective", Proceedings of 2018 IEEE International Conference on Bioinformatics and Biomedicine (BIBM), Dec. 3-6, 2018, pp. 461-466, Madrid, Spain.

Non-Final Rejection Mailed on Feb. 25, 2026 for U.S. Appl. No. 18/322,091, 57 page(s).

Trabelsi, Mohamed et al., "Semantic Labeling Using a Deep Contextualized Language Model", submitted to Cornell University Olin Online Library Archive on Oct. 30, 2020, available on the Internet at https://arxiv.org/pdf/2010.16037, 11 pages.

Notice of Allowance and Fees Due (PTOL-85) Mailed on Jul. 6, 2026 for U.S. Appl. No. 18/322,091, 50 page(s).

* cited by examiner

CANONICAL TRANSFORMATIONS USING MACHINE LEARNING LANGUAGE MODEL

BACKGROUND

Various embodiments of the present disclosure address technical challenges related to data aggregation and transformation across large scale, incompatible datasets given limitations of existing computer data processing and interpretation techniques. Existing processes for aggregating data across a plurality of incompatible datasets leverage rule-based extract, transform, and loading (ETL) systems to manually reconcile inconsistent metadata across multiple disparate datasets with inconsistent data formats. ETLs are static and lack the adaptability for addressing changes to datasets and/or the formatting thereof. Moreover, the development of ETLs is time consuming and costly due to their reliance on highly trained resources and, if developed, ETLs are point-to-point solutions which reduce their ultimate scalability. Additionally, computer data processing techniques, such as ETLs, may be directly tailored to a specific transformation between known data sources. Traditionally, such techniques may be hard coded to handle complex data relationships and may be unable to handle complex tabular structures, among other complex data structures, that may include multiple hierarchical tables within a single source file in which columns in a parent table may be populated with a child table references, and/or the like. Various embodiments of the present disclosure make important contributions to various existing computer data processing and interpretation techniques by addressing each of these technical challenges.

BRIEF SUMMARY

Various embodiments of the present disclosure disclose a machine learning model architecture and machine learning training approaches for training a model to automatically standardize any data source agnostic to heterogeneous structure and/or levels of nesting. The machine learning architecture may include a language model that is trained to predict a canonical data entity for each unstandardized entry of a third-party dataset regardless of the complexity of the dataset. In this way, using some of the techniques described herein, a machine learning prediction model may be implemented that produces a canonical representation of an unstandardized dataset. By transforming traditionally incompatible datasets into canonical representations, various techniques of the present disclosure may be practically applied to overcome the technical challenges to traditional computer data processing and interpretation techniques. This, in turn, allows for the aggregation of data across a plurality of different, traditionally incompatible, third-party datasets and, ultimately, enables the generation of more granular, accurate, and refined, predictive insights.

In some embodiments, a computer-implemented method includes generating, by one or more processors and using a machine learning prediction model, a canonical representation for an input dataset. The machine learning prediction model is previously trained by: generating a plurality of permutative input embeddings for a training dataset based on a plurality of canonical data entity features, wherein each permutative input embedding of the plurality of permutative input embeddings corresponds to a different sequence of the plurality of canonical data entity features; generating a latent representation based on the plurality of permutative input embeddings; generating an alignment vector representation for the training dataset based on a comparison between the latent representation and a canonical data map; generating an output vector for the training dataset based on the alignment vector representation; generating, using a loss function, a model loss for the machine learning prediction model based on the output vector and a labeled vector for the training dataset; and updating one or more parameters of the machine learning prediction model based on the model loss.

In some embodiments, a computing apparatus includes a memory and one or more processors communicatively coupled to the memory. The one or more processors are configured to generate, using a machine learning prediction model, a canonical representation for an input dataset. The machine learning prediction model is previously trained by: generating a plurality of permutative input embeddings for a training dataset based on a plurality of canonical data entity features, wherein each permutative input embedding of the plurality of permutative input embeddings corresponds to a different sequence of the plurality of canonical data entity features; generating a latent representation based on the plurality of permutative input embeddings; generating an alignment vector representation for the training dataset based on a comparison between the latent representation and a canonical data map; generating an output vector for the training dataset based on the alignment vector representation; generating, using a loss function, a model loss for the machine learning prediction model based on the output vector and a labeled vector for the training dataset; and updating one or more parameters of the machine learning prediction model based on the model loss.

In some embodiments, one or more non-transitory computer-readable storage media include instructions that, when executed by one or more processors, cause the one or more processors to generate, using a machine learning prediction model, a canonical representation for an input dataset. The machine learning prediction model is previously trained by: generating a plurality of permutative input embeddings for a training dataset based on a plurality of canonical data entity features, wherein each permutative input embedding of the plurality of permutative input embeddings corresponds to a different sequence of the plurality of canonical data entity features; generating a latent representation based on the plurality of permutative input embeddings; generating an alignment vector representation for the training dataset based on a comparison between the latent representation and a canonical data map; generating an output vector for the training dataset based on the alignment vector representation; generating, using a loss function, a model loss for the machine learning prediction model based on the output vector and a labeled vector for the training dataset; and updating one or more parameters of the machine learning prediction model based on the model loss.

DETAILED DESCRIPTION

Figure 1:
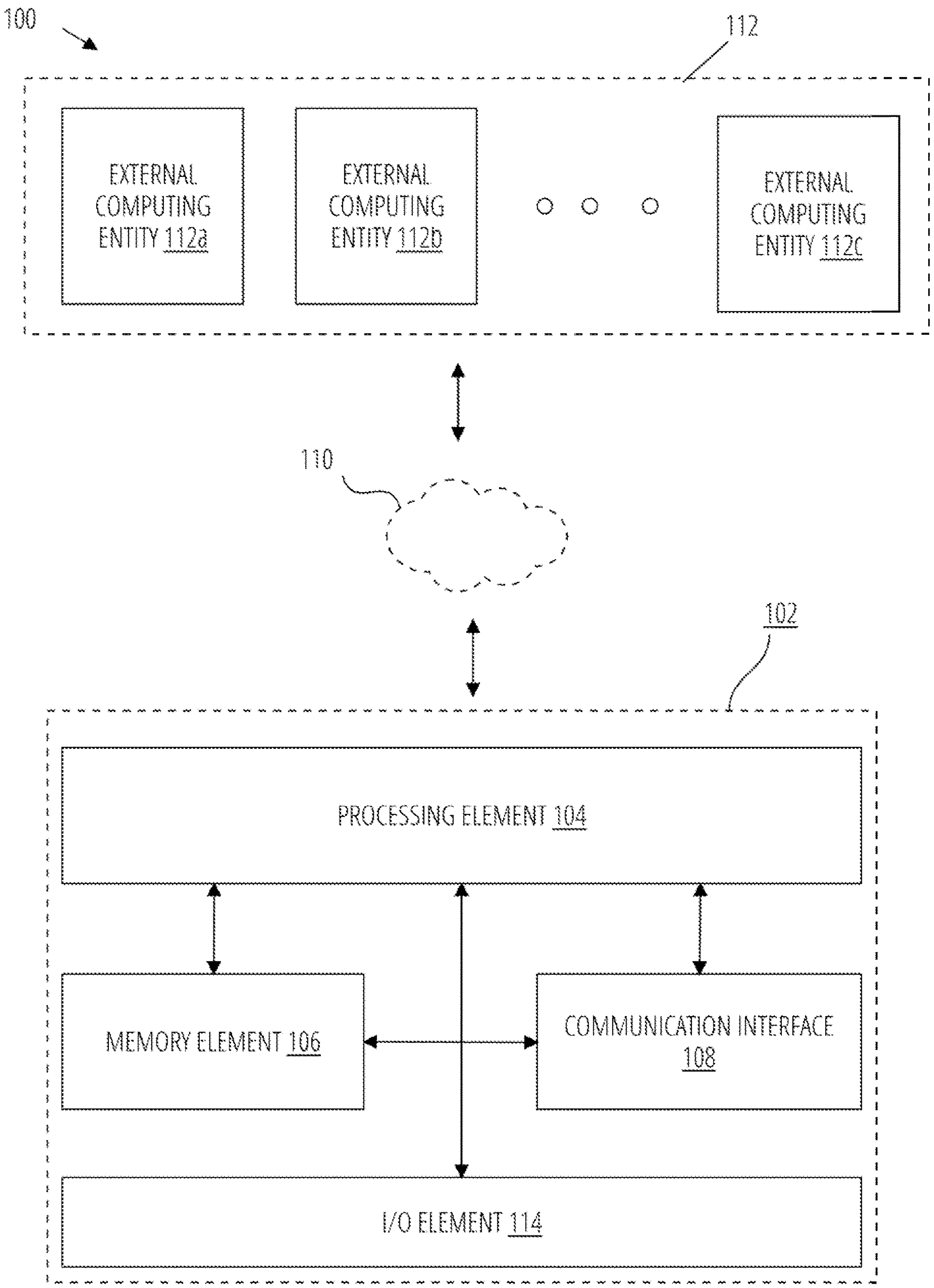
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112*a-c* to perform one or more steps/operations of one or more techniques (e.g., machine learning, data transformation, data aggregation, training, and/or the like) described herein.

The external computing entities 112*a-c*, for example, may include and/or be associated with one or more third-party data sources that may be configured to receive, store, manage, and/or facilitate third-party datasets that may be provided to the predictive computing entity 102. By way of example, the predictive computing entity 102 may include a data processing system that is configured to aggregate data from across one or more of the external computing entities 112*a-c* to generate one or more predictive insights among other data processing tasks. The external computing entities 112*a-c*, for example, may be associated with one or more data repositories, cloud platforms, compute nodes, organizations, and/or the like, that may be individually and/or collectively leveraged by the predictive computing entity 102 to obtain data for a prediction domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
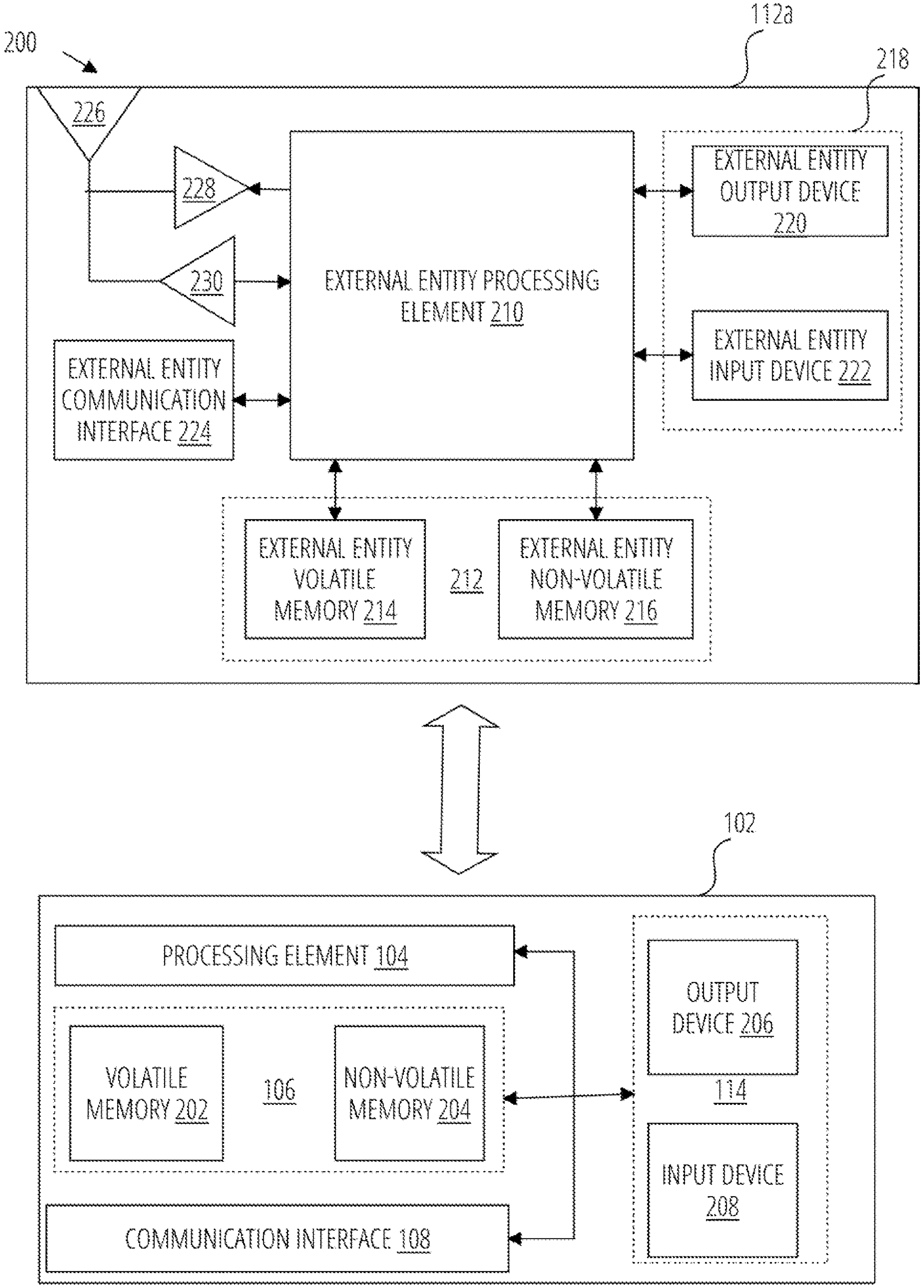
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "canonical model" refers to a data structure that describes a standardized representation of data that may be leveraged by a first party to aggregate unstandardized and inconsistent data from a plurality of disparate third-party data sources. A canonical data model may include a plurality of canonical data entities. Each canonical data entity may include a standardized data object, such as a data table, and/or the like, including one or more canonical fields and/or first-party metadata describing one or more attributes of the canonical data entity. By way of example, the one or more fields may include data values for a respective canonical data entity (e.g., a field in a respective column of a canonical table, etc.). The first-party metadata may include one or more entity parameters for a canonical data entity, such as data fields, field descriptions, entity descriptions, primitive data types, logical data types, hierarchical field paths, and/or the like.

In some embodiments, the term "input dataset" refers to a structure that describes an unstandardized dataset from a third-party data source. An input dataset, for example, may include a raw data file indicative of structured and/or unstructured data. In some examples, the input dataset may include one or more data tables including a plurality of unstandardized data fields. Each unstandardized data field, for example, may include a unit of data with inconsistent metadata. The inconsistent metadata may describe one or more field descriptions, column values, and/or the like that are specific to a third-party data source.

In some embodiments, the term "canonical representation" refers to a data structure that describes a standardized representation of a third-party dataset. A canonical representation may include a plurality of canonical data entities (e.g., columns in a table, etc.) that correspond to one or more data entries for a third-party dataset. For example, data entries from a plurality of third-party sources may each include one or more data features that are defined by one or more inconsistent formats with different types of metadata. This technical problem may be prevalent in data aggregation systems and impedes the aggregation of data across third-party sources. A canonical representation of a third-party dataset may identify a plurality of canonical data entities for the unstandardized data entries of a third-party data set to enable the aggregation of disparate data from different third-parties into more robust datasets.

In some embodiments, the term "machine learning prediction model" refers to a data structure that describes parameters, hyper-parameters, and/or defined operations of a machine learning model (e.g., model including at least one of one or more rule-based layers, one or more layers that depend on trained parameters, coefficients, and/or the like). The machine learning prediction model may include a language model that is trained to generate a canonical representation for an input dataset. The machine learning prediction model may include one or more of any type of machine learning model including one or more supervised, unsupervised, semi-supervised, reinforcement learning models, and/or the like. In some examples, the machine learning prediction model may include multiple models configured to perform one or more different stages of a transformation process.

In some examples, the machine learning prediction model may include a natural language processor (NLP). For instance, the NLP may include one or more statistical models, one or more neural language models, and/or the like. In some examples, the machine learning prediction model may include a plurality of models jointly trained, using one or more machine learning training techniques, to generate canonical representations for one or more input datasets. The machine learning prediction model, for example, may include a plurality of neural networks, such as feedforward artificial neural networks, perceptron and multilayer perceptron neural networks, radial basis functions artificial neural networks, recurrent neural networks, modular neural networks, and/or the like. In some examples, the machine learning prediction model may include one or more bidirectional recurrent neural networks.

In some examples, the machine learning prediction model may include a machine learning pipeline including one or more machine learning neural network layers, one or more activation functions, alignment functions, and/or the like. By way of example, the one or more machine learning layers may include one or more bidirectional recurrent neural networks, and/or the like. The activation functions may include one or more sigmoid functions, softmax functions, and/or the like. The alignment functions may include one or more hash alignment functions, and/or the like.

In some embodiments, the term "permutative input embedding" refers to a data structure that describes an intermediate representation of at least a portion of an input dataset. A permutative input embedding may include a permutative canonical feature embedding. For example, a permutative canonical feature embedding may include a dense vector of floating-point values of specified length that represent different sequences of canonical features, such as data fields, field descriptions, canonical data entities, entity descriptions, primitive data types, logical data types, hierarchical field paths, and/or the like. The canonical data features may be used as training features during training. Each permutative input embedding may include an arrangement of the canonical features in different permutations per canonical entity to construct multiple vectors for each of a plurality of unstandardized data entries of an input dataset. A permutative input embedding may correspond to a respective sequence of the plurality of canonical data entity features.

In some embodiments, the term "neural network layer" refers to a data structure that describes parameters, hyperparameters, and/or defined operations of a machine learning model (e.g., model including at least one of one or more rule-based layers, one or more layers that depend on trained parameters, coefficients, and/or the like). In some examples, a neural network layer 408 may include a neural network, such as a feedforward artificial neural network, perceptron and multilayer perceptron neural network, a radial basis functions artificial neural network, a recurrent neural network, a modular neural network, and/or the like. In some examples, a neural network layer may include a recurrent neural network, such as bidirectional neural network, LSTM, and/or the like, that is configured to generate a latent representation for an input dataset based on a plurality of permutative input embeddings. The neural network layer may be a portion of the machine learning prediction model. By way of example, the latent representation may include an intermediate output of the machine learning prediction model.

In some embodiments, the term "latent representation" refers to a data structure that describes an intermediate representation of at least a portion of the input dataset. In some examples, the latent representation may include a source latent embedding for a source table from the input dataset. In some examples, the latent representation may include a learned weight matrix output by one or more neural network layers of the machine learning prediction model. The learned weight matrix may include an entity weight for each field of the source table. In some examples, the latent representation may be denoted as H(m,n), where m refers to a number of vectors (e.g., input embeddings) and n refers to the size of each of the vectors.

In some embodiments, the term "alignment vector representation" refers to a data structure that describes an intermediate representation of at least a portion of the input dataset. In some examples, the alignment vector representation may include a logic representation of a vector hash alignment. The vector hash alignment, for example, may include an aggregation (e.g., dot product, and/or the like) of the latent representation and a canonical data map. In some examples, the alignment vector representation may be denoted as a A(m,n) where m refers to a number of vectors (e.g., input embeddings) and n refers to the size of each of the vectors.

In some embodiments, the term "canonical data map" refers to a data structure that represents a plurality of labeled canonical data entities. The canonical data map may be based on a canonical data model. For example, the canonical data map may include one or more previously generated canonical representations that describe a plurality of standardized data entities.

In some embodiments, the term "hidden state output" refers to a data structure that describes an intermediate representation of at least a portion of the input dataset. The hidden state output may be an intermediate state of the machine learning prediction model. In some examples, the hidden state output may be generated using an activation function, such as a sigmoid activation function, binary step function, linear function, tanh function, and/or the like. In some examples, the activation function may include a sigmoid activation function. In some examples, the hidden state output may include a plurality of discrete scores for a canonical data entity for a given set of fields from an unstandardized data entity.

In some embodiments, the term "refined hidden state output" refers to a data structure that describes an intermediate representation of at least a portion of the input dataset. The refined hidden state output may include a smoothened hidden state output. For example, the refined hidden state output may be generated by applying another activation function, such as a softmax function, and/or the like, to the hidden state output. For instance, the refined hidden state output may include a plurality of probability scores (e.g., between 0 and 1) for a canonical data entity for a given set of fields from an unstandardized data entity.

In some embodiments, the term "output vector" refers to a data structure that describes an output of the machine learning prediction model. The output vector may include a canonical representation of an input dataset. For instance, the output vector may include a two-dimensional vector that identifies a canonical data entity that corresponds to each unstandardized data field in an input dataset.

In some embodiments, the term "training dataset" refers to an input dataset that is used to train a machine learning model. In some examples, the training dataset may include an input dataset that is associated with ground truth data. The ground truth data, for example, may include one or more ground truth canonical labels for each of the unstandardized data fields of the training dataset.

In some embodiments, the term "labeled vector" refers to a data structure that describes a ground truth label for an output vector of the machine learning prediction model. The labeled vector, for example, may include a labeled ground truth data for a training data field of the training dataset. The labeled vector may include a two dimensional vector that identifies a ground truth canonical data entity for each unstandardized data field in a training dataset.

In some embodiments, the term "model loss" refers to a data structure that describes a performance of the machine learning prediction model. The model loss may include a loss metric for training the machine learning prediction model. The model loss may include any of a plurality of different types of loss metrics, such as cross entropy loss, mean-squared error, Huber loss, hinge loss, and/or the like. In some examples, the model loss may include a cross entropy loss between an output vector and a corresponding labeled vector.

In some embodiments, the term "loss function" refers to a data structure that describes parameters, hyper-parameters, and/or defined operations of a machine learning loss function. In some examples, the loss function may be configured to generate a model loss for the machine learning prediction model based on a comparison between an output vector and a corresponding labeled vector. The loss function may include any type of loss function, such as a cross entropy loss function, mean-squared error loss function, Huber loss function, hinge loss function, and/or the like. By way of example, the loss function may include a cross-entropy loss function.

IV. Overview, Technical Improvements, and Technical Advantages

Some embodiments of the present disclosure present machine learning techniques that improve the aggregation and computer interpretation of disparate, incompatible, third-party datasets by generating and training a language based machine learning model configured to dynamically transform a third-party dataset to a canonical representation of the dataset. Traditionally, third-party datasets may be defined by various incompatible data formats that prevent the aggregation of data and, ultimately, the generation of predictive insights derived from a plurality of disparate third-party data sources. Some of the machine learning techniques of the present disclosure, enable the transformation of traditionally incompatible datasets into canonical representations that may be interpreted and aggregated with other sources of data. In some embodiments of the present disclosure, the machine learning techniques allow for the continuous refinement of a machine learning model, such that the machine learning model adapts to changes in third-party datasets. In this manner, some of the techniques of the present disclosure enable an adaptable, scalable, and robust technical solution to the technical problem of the incompatible datasets due to the disparity and individual characteristics of third-party data sources.

For example, some techniques of the present disclosure provide for a machine learning prediction model that may be trained to generate a canonical representation of an input dataset. The machine learning prediction model may be trained to generate a canonical representation that aligns with a canonical model defined by a first party. Using the machine learning prediction model, the first party may (i) receive a plurality of input datasets from various third-party sources and defined by various data formats and/or standards respectively associated with the third-party data sources and (ii) transform each of the datasets into canonical representations that may be used to aggregate data from across each of the datasets. By transforming a variety of disparate, incompatible datasets into standardized, canonical representations, some embodiments of the present disclosure may be practically applied to directly address data incompatibly limitations for traditional data processing and computer interpretation systems, ultimately resulting in improved computer predictions and data insights.

In addition, some techniques of the present disclosure provide for machine learning training techniques to generate and optimize a machine learning prediction model with respect to third-party datasets. The training techniques may enable the generation and continual refinement of a language based machine learning model configured to transform incompatible third-party data sets into a universal canonical counterpart. The machine learning model may be continuously and automatically refined to accommodate data formatting changes across a plurality of third-party datasets. In this manner, the training techniques of the present disclosure may be practically applied to improve upon traditional rule-based data conversion techniques that are (i) limited to particular, static, data formats, (ii) lack scalability, and (iii) require continuous maintenance.

Example inventive and technologically advantageous embodiments of the present disclosure include machine learning techniques for transforming a third-party dataset to a canonical representation of the third-party dataset, machine learning training techniques for generating and/or refining a machine learning model, among others.

V. Example System Operations

As indicated, various embodiments of the present disclosure make important technical contributions to data processing and interpretation technology. In particular, systems and methods are disclosed herein that implement machine learning techniques for transforming input datasets to canonical representations of the input datasets. Unlike traditional data conversion techniques, the machine learning techniques of the present disclosure leverage a language based machine learning model to generate canonical representations that are adaptable to data formatting changes of the input dataset.

Figure 3:
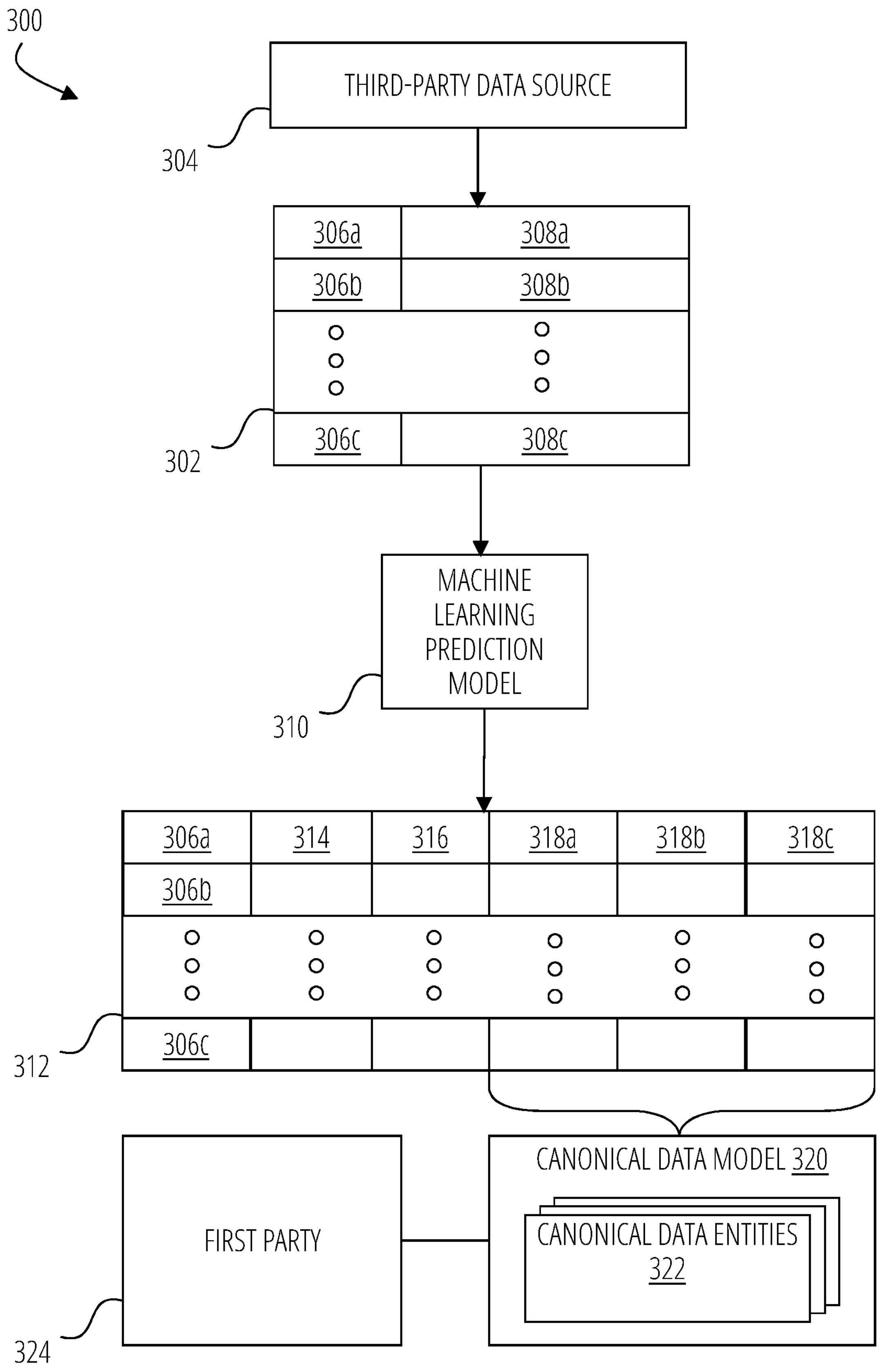
FIG. 3 provides an operational example of a performance of the machine learning prediction model in accordance with some embodiments discussed herein.

FIG. 3 provides an operational example 300 of a performance of the machine learning prediction model in accordance with some embodiments discussed herein. The operational example 300 depicts an example input dataset 302 from a third-party data source 304. The input dataset 302 may be processed by a machine learning prediction model 310 to generate a canonical representation 312 for the input dataset 302. The canonical representation 312 may be based on a canonical data model 320 that provides a standardized representation for aggregating data across a plurality of incompatible datasets from multiple disparate third-party data sources, including the third-party data source 304.

In some embodiments, the input dataset 302 is a data structure that describes an unstandardized dataset from the third-party data source 304. The input dataset 302, for example, may include a raw data file indicative of structured and/or unstructured data. In some examples, the input dataset 302 may include one or more data tables including a plurality of unstandardized data fields 306*a-c*. For instance, the input dataset 302 may include a first data field 306*a*, a second data field 306*b*, a third data field 306*c*, and/or the like. Each data field may include a data field with inconsistent metadata. The inconsistent metadata 308*a-c* may describe one or more field descriptions, column values, and/or the like that are specific to the third-party data source 304. By way of example, the first data field 306*a* may include first metadata 308*a* that includes a plurality of column values for the first data field 306*a*, the second data field 306*b* may include second metadata 308*b* that includes a plurality of column values for the second data field 306*b*, the third data field 306*c* may include third metadata 308*c* that includes a plurality of column values for the third data field 306*c*.

The input dataset 302, including the data fields 306*a-c* and metadata 308*a-c*, may depend on a prediction domain. For example, the techniques of the present disclosure may be applicable in any of a number of different prediction domains for transforming robust inconsistent datasets from a plurality of third-party data sources to standardized representations. In some examples, the prediction domain may include a clinical domain in which clinical data, such as medical claims, and/or the like, is aggregated from a plurality of different healthcare providers. In such a case, a first data fields 306*a* may describe a dosage for a medication and the first metadata 308*a* may be indicative of third-party field description for a dosage and a plurality of column values descriptive of one or more different dosage instructions, amounts, and/or the like. As another example, a second data field 306*b* may describe an ingredient strength for a medication and the second metadata 308*b* may be indicative of a third-party field description for an ingredient strength and a plurality of column values descriptive of one or more different ingredient strengths, and/or the like. As yet another example, a third data field 306*c* may describe a medication RxNorm and the third metadata 308*c* may be indicative of a third-party field description for an RxNorm value and a plurality of column values descriptive of one or more different RxNorms, and/or the like.

As described herein, the input dataset 302 may include a plurality of data fields 306*a-c* that are inconsistent with a plurality of standardized, canonical data entities 322 of a canonical data model 320 defined by a first party 324.

In some embodiments, the canonical data model 320 is a data structure that describes a standardized representation of a data that may be leveraged by a first party 324 to aggregate unstandardized and inconsistent data from a plurality of disparate third-party data sources. A canonical data model 320 may include a plurality of canonical data entities 322. Each canonical data entity may include a standardized data object, such as a data table, and/or the like, including one or more canonical fields and/or first-party metadata describing one or more attributes of the canonical data entity. By way of example, the one or more fields may include data values for a respective canonical data entity (e.g., a field in a respective column of a canonical table, etc.). The first-party metadata may include one or more entity parameters for a canonical data entity, such as data fields, field descriptions, entity descriptions, primitive data types, logical data types, hierarchical field paths, and/or the like.

To improve data interpretability of robust data aggregation techniques, the input dataset 302 may be processed by a machine learning prediction model 310 configured to transform the input dataset 302 to a canonical representation 312.

In some embodiments, the machine learning prediction model 310 is a data structure that describes parameters, hyper-parameters, and/or defined operations of a machine learning model (e.g., model including at least one of one or more rule-based layers, one or more layers that depend on trained parameters, coefficients, and/or the like). The machine learning prediction model 310 may include a language model that is trained to generate a canonical representation 312 for an input dataset 302. The machine learning prediction model 310 may include one or more of any type of machine learning model including one or more supervised, unsupervised, semi-supervised, reinforcement learning models, and/or the like. In some examples, the machine learning prediction model 310 may include multiple models configured to perform one or more different stages of a data transformation process.

In some examples, the machine learning prediction model 310 may include a natural language processor (NLP). For instance, the NLP may include one or more statistical models, one or more neural language models, and/or the like. In some examples, the machine learning prediction model 310 may include a plurality of models jointly trained, using one or more machine learning training techniques, to generate canonical representations for one or more input datasets. The machine learning prediction model 310, for example, may include a plurality of neural networks, such as feedforward artificial neural networks, perceptron and multilayer perceptron neural networks, radial basis functions artificial neural networks, recurrent neural networks, modular neural networks, and/or the like. In some examples, the machine learning prediction model 310 may include one or more bidirectional recurrent neural networks, such as one or more bidirectional recurrent neural networks, long short-term memory networks (LSTMs), and/or the like.

In some examples, the machine learning prediction model 310 may include a machine learning pipeline including one or more machine learning neural network layers, one or more activation functions, alignment functions, and/or the like. By way of example, the one or more machine learning layers may include one or more bidirectional recurrent neural networks, and/or the like. The activation functions may include one or more sigmoid functions, softmax functions, and/or the like. The alignment functions may include one or more hash alignment functions, and/or the like.

The machine learning prediction model 310 may be previously trained, using one or more training techniques of the present disclosure, to generate a canonical representation 312 for the input dataset 302.

In some embodiments, the canonical representation 312 is a data structure that describes a standardized representation of a third-party dataset. For example, the canonical representation 312 may map each of the plurality data fields 306*a-c* from the input dataset 302 to a respective canonical data entity of the 320. In some examples, the canonical representation 312 may include a two-dimensional output vector. The two-dimensional output vector may be indicative of each respective data field from the input dataset, one or more attributes for each respective data field, and a canonical statuses for between each respective data field and each of the canonical data entities 322.

By way of example, the canonical data entities 322 may include a first, second, and third canonical data entity. The canonical representation 312 may include one or more attributes and entity statuses for the first data field 306*a*, the second data field 306*b*, and/or the third data field 306*c*. The one or more attributes for the first data field 306*a*, for example, may include a primitive data type 314 and/or a logical data type 316 for the first data field 306*a*. The one or more entity statuses 318*a-c* for the first data field 306*a* may include a first entity status 318*a* that describes whether the first data field 306*a* corresponds to the first canonical data entity, a second entity status 318*b* that describes whether the first data field 306*a* corresponds to the second canonical data entity, and/or a third entity status 318*c* that describes whether the first data field 306*a* corresponds to a third canonical data entity. In some examples, the entity statuses 318*a-c* may include a binary value. By way of example, the entity statuses 318*a-c* may include a "1" to identify a canonical data entity that corresponds to the first data field 306*a* and a "0" to identify each of the canonical data entities that do not correspond to the first data field 306*a*.

In this manner, data entries from a plurality of third-party data sources that each include one or more data features that are defined by one or more inconsistent formats with different types of metadata may be linked to corresponding canonical data entities. For instance, the canonical representation 312 of a third-party dataset may identify a plurality of canonical data entities for the unstandardized data entries of a third-party data set to enable the aggregation of disparate data from different third-parties into more robust datasets.

In some embodiments, the machine learning prediction model 310 is configured to process the input dataset 302 over one or more processing phases to generate the canonical representation 312. For instance, during a first processing phase, a first portion of the machine learning prediction model 310 may be configured to generate a latent representation for the input dataset 302. An example of the first processing phase will now further be described with reference to FIG. 4.

Figure 4:
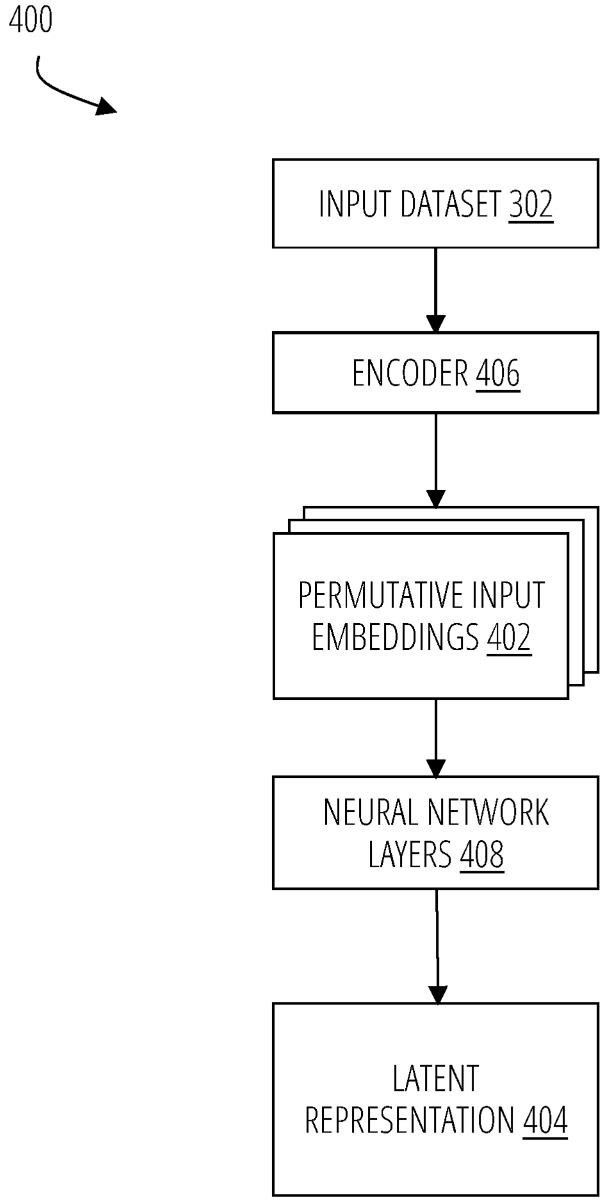
FIG. 4 is a dataflow diagram showing a first processing phase of a machine learning prediction model in accordance with some embodiments discussed herein.

FIG. 4 is a dataflow diagram 400 showing a first processing phase of a machine learning prediction model in accordance with some embodiments discussed herein. The dataflow diagram 400 depicts a set of data structures for generating a latent representation 404 for an input dataset 302. The latent representation 404 may be an intermediate representation generated by the machine learning prediction model to ultimately generate a canonical representation of the input dataset 302.

In some embodiments, a plurality of permutative input embeddings 402 is generated for the input dataset 302. The permutative input embeddings 402 may be generated by encoding a plurality of features for an unstandardized data field of the input dataset 302 with respect to a plurality of training features of a canonical data model. For example, the permutative input embeddings 402 may be generated based on a plurality of canonical data entity features. In some examples, each of the plurality of permutative input embeddings 402 may correspond to a different sequence of the plurality of canonical data entity features. As described herein, the encoded features may be leveraged by the machine learning prediction model to generate a canonical representation for the input dataset 302.

In some embodiments, a permutative input embedding is a data structure that describes an intermediate representation of at least a portion of the input dataset 302. Each of the permutative input embeddings 402 may include a permutative canonical feature embedding. For example, an input embedding may include a dense vector of floating-point values of specified length that represent different sequences of canonical features, such as data fields, field descriptions, canonical data entities, entity descriptions, primitive data types, logical data types, hierarchical field paths, and/or the like. The canonical data features may be used as training features during training. Each of the permutative input embeddings 402 may include an arrangement of the canonical features in different permutations per canonical entity to construct multiple vectors for each of the unstandardized data entries of the input dataset 302. Each of the plurality of permutative input embeddings 402 may correspond to a different sequence of the plurality of canonical data entity features. In some examples, the input dataset 302 may have at least two data fields and a count for the permutative input embeddings 402 may be represented using nPr, nCr, and/or the like.

In some embodiments, the input dataset 302 is preprocessed to generate metadata for each of the data fields of the input dataset 302. The metadata, for example, may include a predicted primitive data, a predictive logical data type, and/or any other metadata for a respective data field. The metadata may be generated using an encoder 406. The encoder 406, for example, may include one or more transformer pre-trained models configured to perform one or more data synthesis and enrichment operations. The encoder 406 may include a plurality of machine learning models jointly configured to generate a logical data model for the input dataset 302. The logical data model may include primitive and logical data types for each data field in an input dataset 302. In some examples, the permutative input embeddings 402 may be generated based on the logical data model for the input dataset 302.

In some embodiments, a latent representation 404 is generated based on the plurality of permutative input embeddings 402. The latent representation 404 may be generated using one or more neural network layers 408 of the machine learning prediction model. For example, the permutative input embeddings 402 may be input to the neural network layers 408 to generate the latent representation 404.

In some embodiments, the neural network layers 408 are data structures that describe parameters, hyper-parameters, and/or defined operations of a machine learning model (e.g., model including at least one of one or more rule-based layers, one or more layers that depend on trained parameters, coefficients, and/or the like). In some examples, the neural network layers 408 may include neural networks, such as feedforward artificial neural networks, perceptron and multilayer perceptron neural networks, radial basis functions artificial neural networks, recurrent neural networks, modular neural networks, and/or the like. In some examples, the neural network layers 408 may include recurrent neural networks, such as bidirectional neural networks, LSTMs, and/or the like, that are configured to generate a latent representation 404 for the input dataset 302 based on the permutative input embeddings 402. The neural network layers 408 may be a portion of the machine learning prediction model. By way of example, the latent representation 404 may include an intermediate output of the machine learning prediction model.

In some embodiments, the latent representation 404 is a data structure that describes an intermediate representation of at least a portion of the input dataset 302. In some examples, the latent representation 404 may include a source latent embedding for a source table from the input dataset 302. In some examples, the latent representation 404 may include a learned weight matrix output by one or more neural network layers 408 of the machine learning prediction model. The learned weight matrix may include an entity weight for each data field of the input dataset 302 (and/or a source table there). In some examples, the latent representation 404 may be denoted as H(m,n), where m refers to a number of vectors (e.g., permutative input embeddings 402) and n refers to the size of each of the vectors. The latent representation 404 may be indicative of a plurality of feature weights for each of the plurality of canonical data entity features. By way of example, the input dataset 302 may include a plurality of data fields and the plurality of feature weights of the latent representation 404 may include one or more feature weights between each of the plurality of data fields and each of the plurality of canonical data entity features.

By way of example, the permutative input embeddings 402 may include an exhaustive representation of canonical data entities and its respective fields in all possible scenarios. The permutative input embeddings 402 may be passed to the neural network layers 408 to learn overlapping cases between canonical data entities, for example, in a scenario in which a number of fields are common across different entities. By way of example, in a clinical prediction domain, there may be scenarios where attributes like "name," "phone," "fax," "address" etc. can be common across entities like "patient," "related person," "practitioner," "organization" etc. Training of such permutative input embeddings 402 using neural network layers 408, such as a bidirectional recurrent neural network architecture, may improve learning such dependencies and generate overlapping scores between entity-entity and entity-fields, such learnings are preserved in hidden layer neurons weights.

As described herein, in some examples, the latent representation 404 may include an intermediate representation of the input dataset 302. The latent representation 404 may be further processed by one or more additional portions of the machine learning prediction model to generate an output vector for the input dataset 302. For example, during a second processing phase for the machine learning prediction model, the latent representation 404 may be refined to generate predictions for each unstandardized data field of the input dataset 302. An example of the second processing phase will now further be described with reference to FIG. 5.

Figure 5:
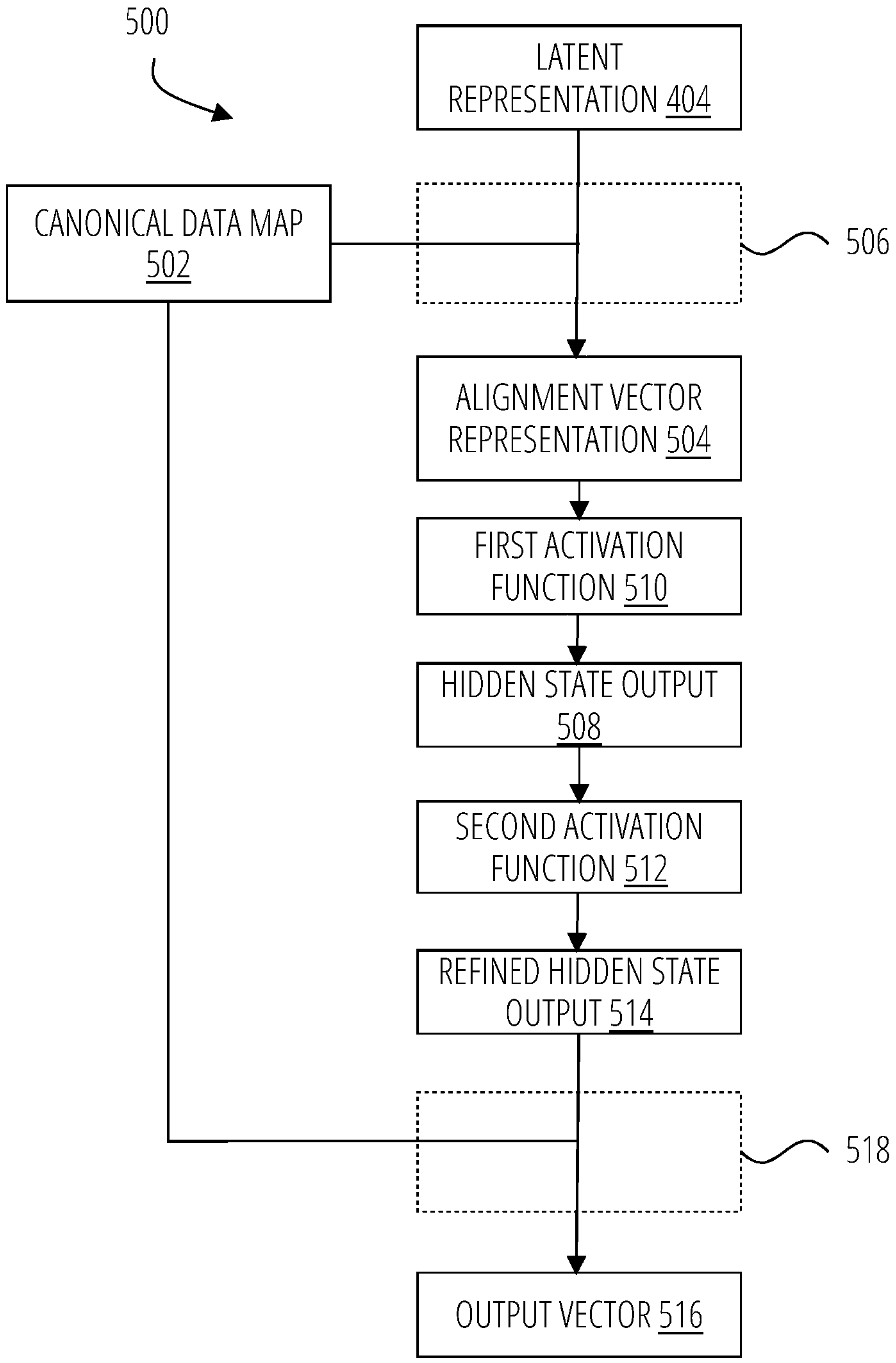
FIG. 5 is a dataflow diagram showing a second processing phase for a machine learning prediction model in accordance with some embodiments discussed herein.

FIG. 5 is a dataflow diagram 500 showing a second processing phase for a machine learning prediction model in accordance with some embodiments discussed herein. The dataflow diagram 500 depicts a set of data structures for generating an output vector 516 for an input dataset based on a latent representation 404. The output vector 516 may be a canonical representation for the input dataset that maps one or more data fields from the input dataset to a canonical data entity defined by a canonical model.

In some embodiments, alignment vector representation 504 is generated for the input dataset based on the latent representation 404 and the canonical data map 502. For example, the alignment vector representation 504 may be generated based on a comparison between the latent representation 404 and the canonical data map 502. In some examples, the alignment vector representation 504 may be based on a dot product between the latent representation 404 and the canonical data map 502.

In some embodiments, the alignment vector representation is a data structure that describes an intermediate representation of at least a portion of the input dataset. In some examples, the alignment vector representation 504 may include a logic representation of a vector hash alignment. The vector hash alignment, for example, may include an aggregation (e.g., dot product, and/or the like) of the latent representation 404 and the canonical data map 502. In some examples, the alignment vector representation 504 may be denoted as A(m,n) where m refers to a number of vectors (e.g., input embeddings) and n refers to the size of each of the vectors. For example, $A(m,n)=\Sigma\Sigma H(m+i,n+j), X(i,j)$.

In some embodiments, the canonical data map 502 is a data structure that represents a plurality of labeled canonical data entities. The canonical data map 502 may be defined based on the canonical data model. For example, the canonical data map 502 may include one or more previously generated canonical representations that describe a plurality of standardized data entities.

In some embodiments, the alignment vector representation 504 is generated through hash alignment between the entity field weights of the latent representation 404 with the canonical data map 502 to detect overlap among entities and entities fields. The alignment vector representation 504 may be indicative of an alignment of the canonical entity weights based on a labeled sample set.

For example, the hash alignment 506 of overlap entities may be performed using the dot product between the latent representation 404 (e.g., an inferred vector) and the canonical data map 502 (e.g., labeled vector). For example, the alignment vector representation 504 may include the concatenation of the dot product between the latent representation 404 and the canonical data map 502. The canonical data map 502 may include a canonical labeled vector that may be created by subject matter experts on exhaustive raw data representing all applicable data types. In this way, the canonical data map 502 may help in alignment of canonical entities with data fields from an input dataset by boosting weights of canonical entities which are closer to data fields.

In some embodiments, a hidden state output 508 is generated based on the alignment vector representation 504. For example, a first activation function 510 may be applied to the alignment vector representation 504 to generate the hidden state output 508. By way of example, the hidden state output 508 may be generated using a sigmoid function. The hidden state output 508 may generate intermediate predictions for one or more canonical data entities that correspond to data fields of an input dataset. By way of example, in a clinical prediction domain, applying first activation function 510 to data fields like "name|phone|address|relationship" may help narrow down to one or more canonical data entities to entities such as "patient," "related person," "person". The hidden state output 508 may be leveraged to classify entities as per the combination of canonical data map 502 and weights from the alignment vector representation 504.

In some embodiments, the hidden state output 508 is an intermediate representation of at least a portion of the input dataset. The hidden state output 508 may be an intermediate state of the machine learning prediction model. In some examples, the hidden state output 508 may be generated using a first activation function 510, such as a sigmoid activation function, binary step function, linear function, tanh function, and/or the like. In some examples, the first activation function 510 may include a sigmoid activation function. In some examples, the hidden state output 508 may include a plurality of discrete scores for a canonical data entity for a given set of fields from an unstandardized data entity.

In some embodiments, a refined hidden state output 514 is generated based on the hidden state output 508. For example, the refined hidden state output 514 may be generated using a second activation function 512. By way of example, the second activation function 512 may be applied to the hidden state output 508 to generate the refined hidden state output 514. The second activation function 512 may include a softmax function.

In some embodiments, the refined hidden state output 514 is a data structure that describes an intermediate representation of at least a portion of the input dataset. The refined hidden state output 514 may include a smoothened hidden state output. For example, the refined hidden state output 514 may be generated by applying a second activation function 512, such as a softmax function, and/or the like, to the hidden state output 508. The second activation function 512 may be applied to the hidden state output 508 to normalize the output to a probability distribution. For instance, the refined hidden state output 514 may include a plurality of probability scores (e.g., between 0 and 1) for a canonical data entity for a given set of fields from an unstandardized data entity.

In some embodiments, an output vector 516 is generated for the input dataset. The output vector 516 may be generated based on the alignment vector representation 504, the hidden state output 508, the refined hidden state output 514, and/or any other intermediate data structure of the machine learning prediction model. In some examples, the output vector 516 may be generated based on the canonical data map 502. For instance, the output vector 516 may be generated based on a comparison between the refined hidden state output 514 and the canonical data map 502. For instance, the output vector 516 may include a dot product 518 between the refined hidden state output 514 and the canonical data map 502.

In some embodiments, the output vector 516 is generated though entity field disambiguation using the dot product 518 between canonical data map 502 and the refined hidden state output 514. For example, canonical data entities identified by the refined hidden state output 514 may include overlapping fields. In order to remove outliers, a dot product 518 may be applied between the canonical data map 502 and refined hidden state output 514. For example, in the event that the refined hidden state output 514 is indicative of a top three probability for three different canonical data entities (e.g., "patient," "related person," "person," etc.), ambiguity may arise if each of the canonical data entities share common fields with the input data set. These ambiguities may be resolved by applying the dot product 518 between the canonical data map 502 and the refined hidden state output 514.

In some embodiments, the output vector 516 is a data structure that describes an output of the machine learning prediction model. The output vector 516 may include a canonical representation of an input dataset. For instance, the output vector 516 may include a two-dimensional vector that identifies a canonical data entity that corresponds to each unstandardized data field in an input dataset.

In some embodiments, during training, the output vector 516 is leveraged to improve the performance of a machine learning prediction model. For example, during a training phase, one or more training techniques may be leveraged to train the machine learning prediction model. An example of the training phase will now further be described with reference to FIG. 6.

Figure 6:
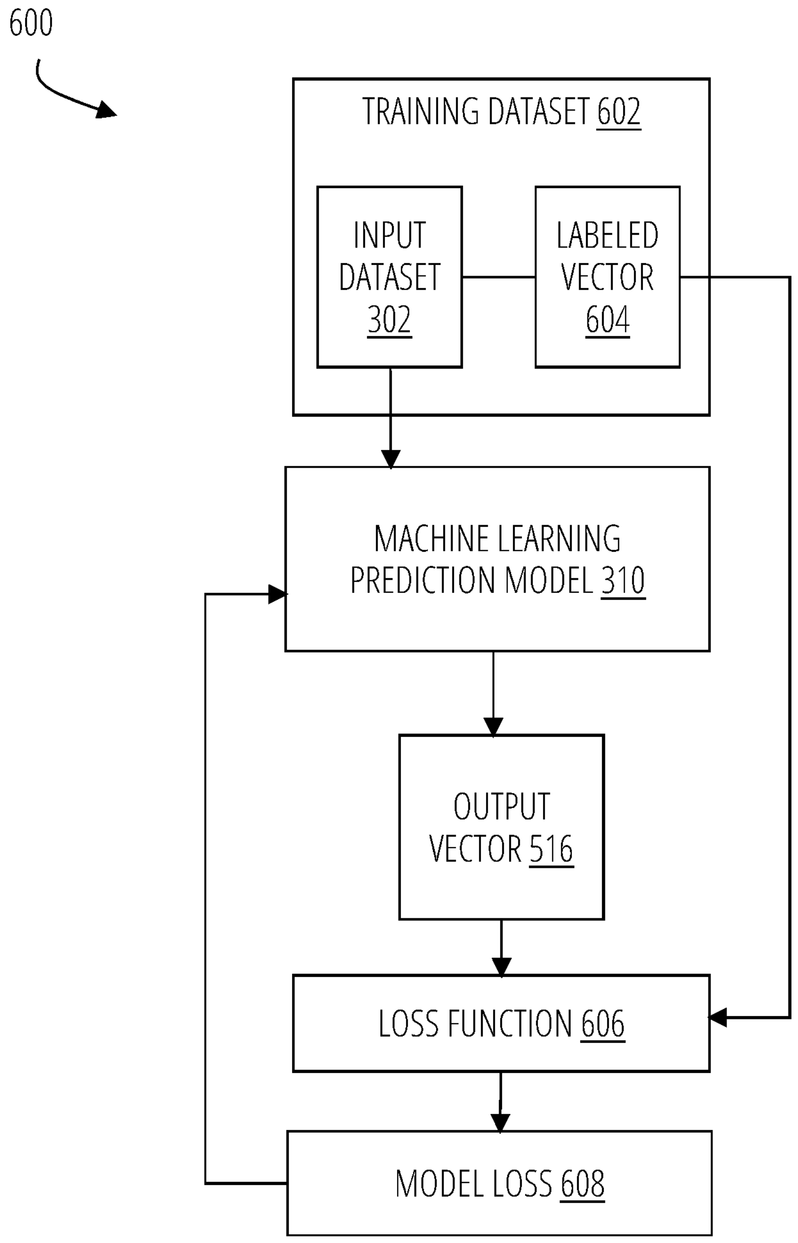
FIG. 6 is a dataflow diagram showing a training phase for a machine learning prediction model in accordance with some embodiments discussed herein.

FIG. 6 is a dataflow diagram 600 showing a training phase for a machine learning prediction model in accordance with some embodiments discussed herein. The dataflow diagram 600 depicts a set of data structures for training the machine learning prediction model 310 using a training dataset 602. The training dataset 602, for example, may include the input dataset 302 and a labeled vector 604 corresponding to the input dataset 302. The machine learning prediction model 310 may be trained based on a comparison between the labeled vector 604 and an output vector 516 generated for the input dataset 302.

In some embodiments, the training dataset 602 is an input dataset that is used to train a machine learning model. In some examples, the training dataset 602 may include an input dataset that is associated with ground truth data. The ground truth data, for example, may include one or more ground truth canonical labels for each of the unstandardized data fields of the training dataset 602. In some examples, the machine learning prediction model 310 is trained over a plurality of training datasets.

In some embodiments, the labeled vector 604 is a data structure that describes a ground truth label for an output vector 516 of the machine learning prediction model 310. The labeled vector 604, for example, may include a labeled ground truth data for a training data field of the training dataset 602. The labeled vector 604 may include a two dimensional vector that identifies a ground truth canonical data entity for each unstandardized data field in a training dataset 602.

In some embodiments, the training dataset 602 is input to the machine learning prediction model 310 to generate an output vector 516. For example, the machine learning prediction model 310 may generate a plurality of permutative input embeddings for the training dataset 602 based on a plurality of canonical data entity features. The machine learning prediction model 310 may generate a latent representation based on the plurality of permutative input embeddings. The machine learning prediction model 310 may generate an alignment vector representation for the training dataset 602 based on a comparison between the latent representation and a canonical data map. And, the machine learning prediction model 310 may generate the output vector 516 for the training dataset 602 based on the alignment vector representation.

In some embodiments, a model loss 608 is generated for the machine learning prediction model 310 based on the output vector 516 and a labeled vector 604 for the training dataset 602. The model loss 608, for example, may be generated using the loss function 606.

In some embodiments, the model loss 608 is a data structure that describes the performance of the machine learning prediction model 310. The model loss 608 may include a loss metric for training the machine learning prediction model 310. The model loss 608 may include any of a plurality of different types of loss metrics, such as cross entropy loss, mean-squared error, Huber loss, hinge loss, and/or the like. In some examples, the model loss 608 may include across entropy loss between the output vector 516 and a corresponding labeled vector 604.

In some embodiments, the loss function 606 is a data structure that describes parameters, hyper-parameters, and/or defined operations of a machine learning loss function. In some examples, the loss function 606 may be configured to generate a model loss 608 for the machine learning prediction model 310 based on a comparison between an output vector 516 and a corresponding labeled vector 604. The loss function 606 may include any type of loss function, such as a cross entropy loss function, mean-squared error loss function, Huber loss function, hinge loss function, and/or the like. By way of example, the loss function 606 may include a cross-entropy loss function.

In some embodiments, one or more parameters of the machine learning prediction model 310 are updated based on the model loss 608. By way of example, the model loss 608 may include a prediction loss that is calculated between the output vector 516 and a true label (e.g., labeled vector 604) of the training dataset 602. Using cross entropy loss, the loss is back propagated to adjust network weights using gradient decent. Optimized weights may be saved for prediction. Once trained, the machine learning prediction model 310 may be leveraged to generate a canonical representation of any input dataset regardless of the complexities of the dataset.

Figure 7:
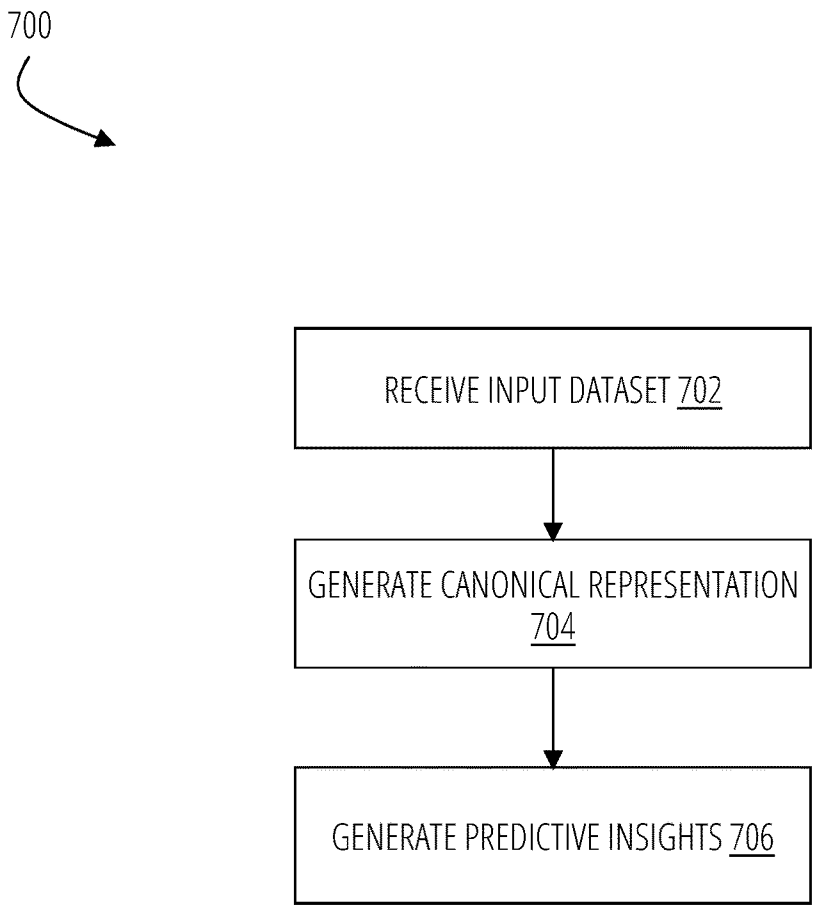
FIG. 7 is a flowchart showing an example of a process for aggregating data from a plurality of different, incompatible third-party datasets in accordance with some embodiments discussed herein.

FIG. 7 is a flowchart showing an example of a process 700 for aggregating data from a plurality of different, incompatible third-party datasets in accordance with some embodiments discussed herein. The flowchart depicts machine learning techniques for generating a canonical representation from an input dataset to overcome various limitations of traditional data processing and computer interpretation systems. The machine learning processing techniques may be implemented by one or more computing devices, entities, and/or systems described herein. For example, via the various steps/operations of the process 700, the computing system 100 may leverage the machine learning techniques to overcome the various limitations with traditional data processors by canonicalizing a distinct, third-party dataset and then leveraging the canonical representation of the third-party dataset to derive insights from a plurality of otherwise incompatible data sources.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, receiving an input data set. For example, the computing system 100 may receive the input dataset from a third-party data source. The input dataset, for example, may originate from a third-party data source. The input dataset may include a plurality of data fields and attributes for each of the data fields. Each data field may be defined according to an unknown, third-party data format that may be incompatible with one or more data formats utilized by various other third-parties. By way of example, the input dataset may include one or more data fields associated with inconsistent metadata that is indicative of one or more field descriptions and/or one or more column values that are specific to the third-party data source.

In some embodiments, the process 700 includes, at step/operation 704, generating a canonical representation. For example, the computing system 100 may generate the canonical representation for the input dataset using a machine learning prediction model. The machine learning prediction model may include a language model previously trained using one or more machine learning techniques as described herein.

In some embodiments, the process 700 includes, at step/operation 706, generating predictive insights. For example, the computing system 100 may generate the predictive insights based on the canonical representation of the input dataset. The predictive insights may be generated, for example, by aggregating data from across a plurality of disparate third-party datasets. Traditionally, such third-party datasets are defined by various incompatible data formats that prevent the aggregation of data and, ultimately, the generation of prediction insights derived from a plurality of disparate third-party data sources. By leveraging the machine learning prediction model of the present disclosure, a canonical representation may be generated for each of a plurality of incompatible third-party datasets. By transforming a variety of disparate, incompatible dataset to standardized, canonical representations, some embodiments of the present disclosure may be practically applied to directly address data incompatibly limitations for traditional data processing and computer interpretation systems, ultimately resulting in improved predictions and data insights.

Figure 8:
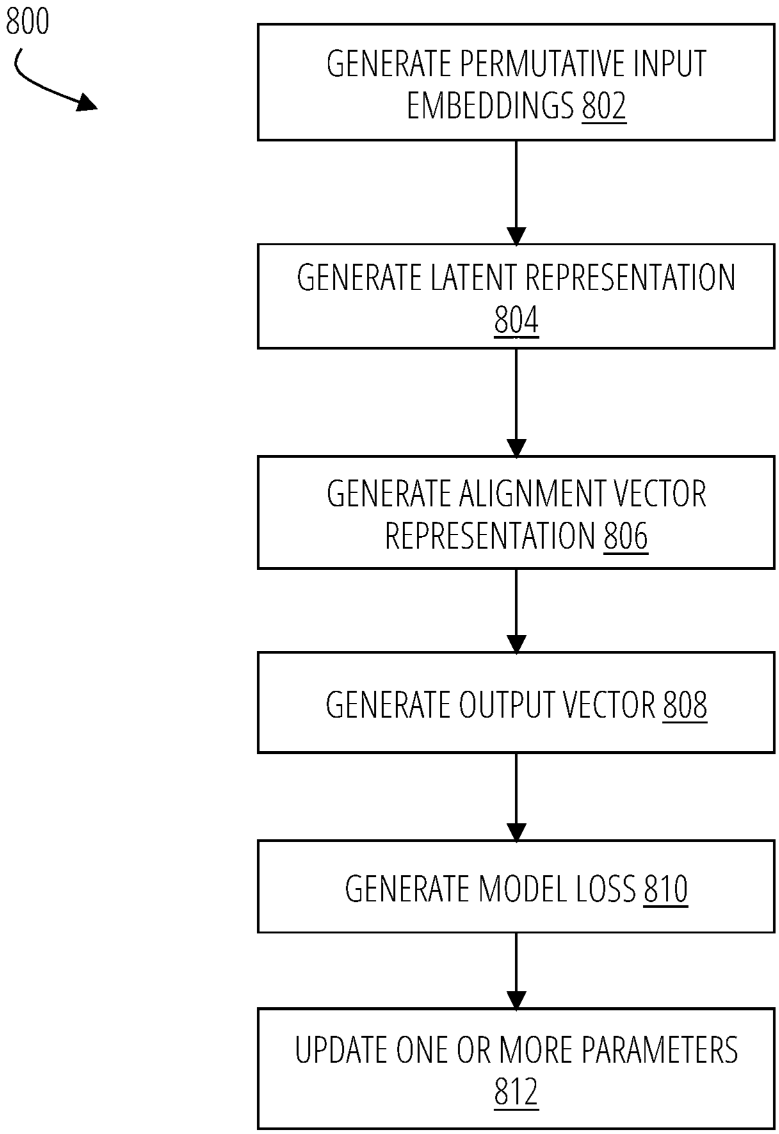
FIG. 8 is a flowchart showing an example of a process for generating a machine learning prediction model in accordance with some embodiments discussed herein.

FIG. 8 is a flowchart showing an example of a process 800 for generating a machine learning prediction model in accordance with some embodiments discussed herein. The flowchart depicts machine learning training techniques for generating a machine learning language based model that is configured to dynamically transform an input dataset into a canonical representation. The machine learning training techniques of the present disclosure may be leveraged to overcome various limitations of traditional machine learning techniques. The machine learning training techniques may be implemented by one or more computing devices, entities, and/or systems described herein. For example, via the various steps/operations of the process 800, the computing system 100 may leverage the machine learning training techniques to overcome the various limitations with traditional machine learning techniques by enabling the generation of a language based machine learning prediction model that is capable of transforming a third-party dataset to a canonical representation.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, generating a plurality of permutative input embeddings. For example, the computing system 100 may generate the plurality of permutative input embeddings based on an input dataset. For instance, the computing system 100 may generate the plurality of permutative input embeddings for a training dataset based on a plurality of canonical data entity features. Each permutative input embedding of the plurality of permutative input embeddings may correspond to a different sequence of the plurality of canonical data entity features.

In some embodiments, the process 800 includes, at step/operation 804, generating a latent representation. For example, the computing system 100 may generate the latent representation for the input dataset. For instance, the computing system 100 may generate the latent representation based on the plurality of permutative input embeddings. In some examples, the latent representation may be generated using one or more neural network layers of a machine learning prediction model. In some examples, the one or more neural network layers of the machine learning prediction model may include a bidirectional recurrent neural network.

The latent representation may be indicative of a plurality of feature weights for each of the plurality of canonical data entity features. For example, the training dataset may include a plurality of data fields. In some examples, the plurality of feature weights of the latent representation may include one or more feature weights between each of the plurality of data fields and each of the plurality of canonical data entity features.

In some embodiments, the process 800 includes, at step/operation 806, generating an alignment vector representation. For example, the computing system 100 may generate the alignment vector representation for the input dataset. For instance, the computing system 100 may generate the alignment vector representation for the training dataset based on a comparison between the latent representation and a canonical data map. In some examples, the alignment vector representation may be based on a dot product between the latent representation and the canonical data map.

In some embodiments, the process 800 includes, at step/operation 808, generating an output vector. For example, the computing system 100 may generate the output vector for the input dataset. For instance, the computing system 100 may generate the output vector for the training dataset based on the alignment vector representation. In some examples, the computing system 100 may generate, using a sigmoid function, a hidden state output for the alignment vector representation. The computing system 100 may generate, using an activation function, a refined hidden state output. The computing system 100 may generate the output vector based on the refined hidden state output. The activation function, for example, may include a softmax function. In some examples, the output vector for the training dataset may include a dot product between the refined hidden state output and the canonical data map.

In some embodiments, the process 800 includes, at step/operation 810, generating a model loss. For example, the computing system 100 may generate the model loss for a machine learning prediction model. For instance, the computing system 100 may generate, using a loss function, the model loss for the machine learning prediction model based on the output vector and a labeled vector for the training dataset. In some examples, the loss function may include a cross entropy loss function and the model loss may include a cross entropy loss between the output vector and the labeled vector. The output vector, for example, may include a two dimensional vector indicative of a canonical table from a canonical model that corresponds to each of a plurality of data fields of the training dataset.

In some embodiments, the process 800 includes, at step/operation 812, updating one or more parameters for the machine learning prediction model. For example, the computing system 100 may update the one or more parameters for the machine learning prediction model. For instance, the computing system 100 may update the one or more parameters of the machine learning prediction model based on the model loss. The one or more parameters may be updated, for example, through back-propagation of errors to optimize the model loss. In this manner, a machine learning prediction model may be trained to generate a canonical representation of a third-party dataset. By doing so, a machine learning prediction model may be continuously and automatically refined to accommodate data formatting changes across a plurality of third-party datasets. In this manner, the training techniques of the present disclosure may be practically applied to improve upon traditional rule-based data conversion techniques that are (i) limited to particular, static, data formats, (ii) lack scalability, and (iii) require continuous maintenance.

As discussed herein, some techniques of the present disclosure enable the generation of new machine learning models with parameters specifically trained and tailored to perform one or more predictive actions to achieve real-world affects. The machine learning models of the present disclosure may be used, applied, and/or otherwise leveraged to generate predictions. These predictions may be leveraged to initiate the performance of various computing tasks that improve the performance of a computing system (e.g., a computer itself, etc.) with respect to various predictive actions performed by the computing system.

In some examples, the computing tasks may include predictive actions that may be based on a prediction domain. A prediction domain may include any environment in which computing systems may be applied to achieve real-word insights, such as predictions, and initiate the performance of computing tasks, such as predictive actions, to act on the real-world insights. These predictive actions may cause real-world changes, for example, by controlling a hardware component, providing targeted alerts, automatically allocating computing or human resources, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated server load balancing actions, automated computing resource allocation actions, automated adjustments to computing and/or human resource management, and/or the like.

As one example, a prediction domain may include a clinical prediction domain. In such a case, the predictive actions may include automated physician notification actions, automated patient notification actions, automated appointment scheduling actions, automated prescription recommendation actions, automated drug prescription generation actions, automated implementation of precautionary actions, automated record updating actions, automated datastore updating actions, automated hospital preparation actions, automated workforce management operational management actions, automated server load balancing actions, automated resource allocation actions, automated call center preparation actions, automated hospital preparation actions, automated pricing actions, automated plan update actions, automated alert generation actions, and/or the like.

In some embodiments, the machine learning prediction model generated through the operations of process 800 is applied to initiate the performance of one or more predictive actions. As described herein, the predictive actions may depend on the prediction domain. In some examples, the computing system 100 may leverage the machine learning prediction model to generate a plurality of canonical representations of a plurality of disparate third-party datasets. Using these canonical representations, the computing system 100 may aggregate data across a plurality of third-party data sources to generate predictive insights for a respective prediction domain. These predictive insights may be leveraged to initiate the performance of the one or more predictive actions within a respective prediction domain. By way of example, the prediction domain may include a clinical prediction domain and the one or more predictive actions may include performing a resource-based action (e.g., allocation of resource), generating a diagnostic report, generating action scripts, generating alerts or messages, generating one or more electronic communications, and/or the like. The one or more predictive actions may further include displaying visual renderings of the aforementioned examples of predictive actions in addition to values, charts, and representations associated with the third-party data sources and/or third-party datasets thereof.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method comprising: generating, by one or more processors and using a machine learning prediction model, a canonical representation for an input dataset, wherein the machine learning prediction model is previously trained by: generating a plurality of permutative input embeddings for a training dataset based on a plurality of canonical data entity features, wherein each permutative input embedding of the plurality of permutative input embeddings corresponds to a different sequence of the plurality of canonical data entity features; generating a latent representation based on the plurality of permutative input embeddings; generating an alignment vector representation for the training dataset based on a comparison between the latent representation and a canonical data map; generating an output vector for the training dataset based on the alignment vector representation; generating, using a loss function, a model loss for the machine learning prediction model based on the output vector and a labeled vector for the training dataset; and updating one or more parameters of the machine learning prediction model based on the model loss.

Example 2. The computer-implemented method of example 1 further comprising: receiving the input dataset from a third-party data source, wherein the input dataset comprises one or more data fields associated with inconsistent metadata that is indicative of one or more field descriptions or one or more column values that are specific to the third-party data source.

Example 3. The computer-implemented method of examples 1 or 2, wherein the latent representation is generated using one or more neural network layers of the machine learning prediction model, wherein the latent representation is indicative of a plurality of feature weights for each of the plurality of canonical data entity features.

Example 4. The computer-implemented method of example 3, wherein the training dataset comprises a plurality of data fields and the plurality of feature weights comprise one or more feature weights between each of the plurality of data fields and each of the plurality of canonical data entity features.

Example 5. The computer-implemented method of examples 3 or 4, wherein the one or more neural network layers of the machine learning prediction model comprise a bidirectional recurrent neural network.

Example 6. The computer-implemented method of any of the preceding examples, wherein the alignment vector representation is based on a dot product between the latent representation and the canonical data map.

Example 7. The computer-implemented method of any of the preceding examples, wherein generating the output vector for the training dataset comprises: generating, using a sigmoid function, a hidden state output for the alignment vector representation, generating, using an activation function, a refined hidden state output, and generating the output vector based on the refined hidden state output.

Example 8. The computer-implemented method of example 7, wherein the activation function comprises a softmax function.

Example 9. The computer-implemented method of examples 7 or 8, wherein the output vector for the training dataset comprises a dot product between the refined hidden state output and the canonical data map.

Example 10. The computer-implemented method of any of the preceding examples, wherein the loss function comprises a cross entropy loss function and the model loss comprises a cross entropy loss between the output vector and the labeled vector.

Example 11. The computer-implemented method of any of the preceding examples, wherein the output vector comprises a two dimensional vector indicative of a canonical table from a canonical model that corresponds to each a plurality of data fields of the training dataset.

Example 12. A computing apparatus comprising memory and one or more processors communicatively coupled to the memory, the one or more processors configured to: generate, using a machine learning prediction model, a canonical representation for an input dataset, wherein the machine learning prediction model is previously trained by: generating a plurality of permutative input embeddings for a training dataset based on a plurality of canonical data entity features, wherein each permutative input embedding of the plurality of permutative input embeddings corresponds to a different sequence of the plurality of canonical data entity features; generating a latent representation based on the plurality of permutative input embeddings; generating an alignment vector representation for the training dataset based on a comparison between the latent representation and a canonical data map; generating an output vector for the training dataset based on the alignment vector representation; generating, using a loss function, a model loss for the machine learning prediction model based on the output vector and a labeled vector for the training dataset; and updating one or more parameters of the machine learning prediction model based on the model loss.

Example 13. The computing apparatus of example 12, wherein the one or more processors are further configured to: receive the input dataset from a third-party data source, wherein the input dataset comprises one or more data fields associated with inconsistent metadata that is indicative of one or more field descriptions or one or more column values that are specific to the third-party data source.

Example 14. The computing apparatus of examples 12 or 13, wherein the latent representation is generated using one or more neural network layers of the machine learning prediction model, wherein the latent representation is indicative of a plurality of feature weights for each of the plurality of canonical data entity features.

Example 15. The computing apparatus of example 14, wherein the training dataset comprises a plurality of data fields and the plurality of feature weights comprise one or more feature weights between each of the plurality of data fields and each of the plurality of canonical data entity features.

Example 16. The computing apparatus of examples 14 or 15, wherein the one or more neural network layers of the machine learning prediction model comprise a bidirectional recurrent neural network.

Example 17. The computing apparatus of any of examples 12 through 16, wherein the alignment vector representation is based on a dot product between the latent representation and the canonical data map.

Example 18. One or more non-transitory computer-readable storage media including instructions that, when executed by one or more processors, cause the one or more processors to: generate, using a machine learning prediction model, a canonical representation for an input dataset, wherein the machine learning prediction model is previously trained by: generating a plurality of permutative input embeddings for a training dataset based on a plurality of canonical data entity features, wherein each permutative input embedding of the plurality of permutative input embeddings corresponds to a different sequence of the plurality of canonical data entity features; generating a latent representation based on the plurality of permutative input embeddings; generating an alignment vector representation for the training dataset based on a comparison between the latent representation and a canonical data map; generating an output vector for the training dataset based on the alignment vector representation; generating, using a loss function, a model loss for the machine learning prediction model based on the output vector and a labeled vector for the training dataset; and updating one or more parameters of the machine learning prediction model based on the model loss.

Example 19. The one or more non-transitory computer-readable storage media of example 18, wherein generating the output vector for the training dataset comprises: generating, using a sigmoid function, a hidden state output for the alignment vector representation, generating, using an activation function, a refined hidden state output, and generating the output vector based on the refined hidden state output.

Example 20. The one or more non-transitory computer-readable storage media of example 19, wherein the activation function comprises a softmax function, and wherein the output vector for the training dataset comprises a dot product between the refined hidden state output and the canonical data map.

The invention claimed is:

1. A computer-implemented method comprising:

generating, by one or more processors and using a machine learning prediction model, a canonical representation for an input dataset, wherein the machine learning prediction model is previously trained by:

generating a plurality of permutative input embeddings for a training dataset based on a plurality of canonical data entity features, wherein each permutative input embedding of the plurality of permutative input embeddings corresponds to a different sequence of the plurality of canonical data entity features;

generating a latent representation based on the plurality of permutative input embeddings;

generating an alignment vector representation for the training dataset based on a comparison between the latent representation and a canonical data map, wherein the canonical data map comprises a canonical labeled vector comprising a label corresponding to a data type of the input dataset;

generating an output vector for the training dataset based on the alignment vector representation;

generating, using a loss function, a model loss for the machine learning prediction model based on the output vector and a labeled vector for the training dataset; and updating one or more parameters of the machine learning prediction model based on the model loss.

2. The computer-implemented method of claim 1 further comprising:

receiving the input dataset from a third-party data source, wherein the input dataset comprises one or more data fields associated with inconsistent metadata indicative of one or more field descriptions or one or more column values specific to the third-party data source.

3. The computer-implemented method of claim 1, wherein the latent representation is generated using one or more neural network layers of the machine learning prediction model, and the latent representation is indicative of a plurality of feature weights for each of the plurality of canonical data entity features.

4. The computer-implemented method of claim 3, wherein the training dataset comprises a plurality of data fields and the plurality of feature weights comprises one or more feature weights between each of the plurality of data fields and each of the plurality of canonical data entity features.

5. The computer-implemented method of claim 3, wherein the one or more neural network layers of the machine learning prediction model comprise a bidirectional recurrent neural network.

6. The computer-implemented method of claim 1, wherein the alignment vector representation is based on a dot product between the latent representation and the canonical data map.

7. The computer-implemented method of claim 1, wherein generating the output vector for the training dataset comprises:

generating, using a sigmoid function, a hidden state output for the alignment vector representation, generating, using an activation function, a refined hidden state output, and generating the output vector based on the refined hidden state output.

8. The computer-implemented method of claim 7, wherein the activation function comprises a softmax function.

9. The computer-implemented method of claim 7, wherein the output vector for the training dataset comprises a dot product between the refined hidden state output and the canonical data map.

10. The computer-implemented method of claim 1, wherein the loss function comprises a cross-entropy loss function and the model loss comprises a cross-entropy loss between the output vector and the labeled vector.

11. The computer-implemented method of claim 1, wherein the output vector comprises a two dimensional vector indicative of a canonical table from a canonical model that corresponds to each of a plurality of data fields of the training dataset.

12. The computer-implemented method of claim 1, wherein the canonical labeled vector is generated using exhaustive raw data representing all data types of the input dataset.

13. A system comprising:

one or more processors; and one or more memories storing processor-executable instructions that, when executed by the one or more processors, cause the one or more processors to perform operations comprising:

generating, using a machine learning prediction model, a canonical representation for an input dataset, wherein the machine learning prediction model is previously trained by:

generating a plurality of permutative input embeddings for a training dataset based on a plurality of canonical data entity features, wherein each permutative input embedding of the plurality of permutative input embeddings corresponds to a different sequence of the plurality of canonical data entity features;

generating a latent representation based on the plurality of permutative input embeddings;

generating an alignment vector representation for the training dataset based on a comparison between the latent representation and a canonical data map, wherein the canonical data map comprises a canonical labeled vector comprising a label corresponding to a data type of the input dataset;

generating an output vector for the training dataset based on the alignment vector representation;

generating, using a loss function, a model loss for the machine learning prediction model based on the output vector and a labeled vector for the training dataset; and updating one or more parameters of the machine learning prediction model based on the model loss.

14. The system of claim 13, wherein the one or more processors are further configured to:

receive the input dataset from a third-party data source, wherein the input dataset comprises one or more data fields associated with inconsistent metadata indicative of one or more field descriptions or one or more column values specific to the third-party data source.

15. The system of claim 13, wherein the latent representation is generated using one or more neural network layers of the machine learning prediction model, and the latent representation is indicative of a plurality of feature weights for each of the plurality of canonical data entity features.

16. The system of claim 15, wherein the training dataset comprises a plurality of data fields and the plurality of feature weights comprises one or more feature weights between each of the plurality of data fields and each of the plurality of canonical data entity features.

17. The system of claim 15, wherein the one or more neural network layers of the machine learning prediction model comprise a bidirectional recurrent neural network.

18. The system of claim 13, wherein the alignment vector representation is based on a dot product between the latent representation and the canonical data map.

19. One or more non-transitory computer-readable media storing processor-executable instructions that, when executed by one or more processors, cause the one or more processors to perform operations comprising:

generating, using a machine learning prediction model, a canonical representation for an input dataset, wherein the machine learning prediction model is previously trained by:

generating a plurality of permutative input embeddings for a training dataset based on a plurality of canonical data entity features, wherein each permutative input embedding of the plurality of permutative input embeddings corresponds to a different sequence of the plurality of canonical data entity features;

generating a latent representation based on the plurality of permutative input embeddings;

generating an alignment vector representation for the training dataset based on a comparison between the latent representation and a canonical data map, wherein the canonical data map comprises a canonical labeled vector comprising a label corresponding to a data type of the input dataset;

generating an output vector for the training dataset based on the alignment vector representation;

generating, using a loss function, a model loss for the machine learning prediction model based on the output vector and a labeled vector for the training dataset; and updating one or more parameters of the machine learning prediction model based on the model loss.

20. The one or more non-transitory computer-readable media of claim 19, wherein generating the output vector for the training dataset comprises:

generating, using a sigmoid function, a hidden state output for the alignment vector representation, generating, using an activation function, a refined hidden state output, and generating the output vector based on the refined hidden state output; and wherein the activation function comprises a softmax function, and the output vector for the training dataset comprises a dot product between the refined hidden state output and the canonical data map.

* * * * *